(12) United States Patent
Evans et al.

(10) Patent No.: US 8,733,811 B2
(45) Date of Patent: May 27, 2014

(54) COMPOSITE TOUCH ZONE FOR AUTOMOTIVE INSTRUMENT PANELS, DOORS, AND CENTER CONSOLES

(75) Inventors: Gregg S. Evans, Stratford (CA); Shin Mizusaki, Okazaki (JP)

(73) Assignee: Intertec Systems, L.L.C., Plymouth, MI (US)

( * ) Notice: Subject to any disclaimer, the term of this patent is extended or adjusted under 35 U.S.C. 154(b) by 0 days.

(21) Appl. No.: 13/421,445

(22) Filed: Mar. 15, 2012

(65) Prior Publication Data
US 2012/0319424 A1    Dec. 20, 2012

Related U.S. Application Data

(60) Provisional application No. 61/452,814, filed on Mar. 15, 2011.

(51) Int. Cl.
*B60R 13/02*     (2006.01)

(52) U.S. Cl.
USPC ....................................... 296/1.08; 296/146.7

(58) Field of Classification Search
CPC   B60R 13/02; B60R 13/0237; B60R 13/0243; B60R 13/025
USPC ................................. 296/187.05, 146.7, 1.08
See application file for complete search history.

(56) References Cited

U.S. PATENT DOCUMENTS

| | | | |
|---|---|---|---|
| 7,284,784 B2 * | 10/2007 | Cowelchuk et al. | 296/153 |
| 8,151,536 B2 * | 4/2012 | Stachura et al. | 296/1.08 |
| 8,507,074 B2 * | 8/2013 | Katou | 296/1.08 |
| 2006/0082173 A1 * | 4/2006 | Cowelchuk et al. | 296/1.08 |

* cited by examiner

*Primary Examiner* — Jason S Morrow
(74) *Attorney, Agent, or Firm* — Dykema Gossett PLLC

(57) ABSTRACT

A method of manufacturing an automotive interior component includes the steps of: providing a mold apparatus comprising a first mold component and a second mold component; providing a substrate; applying a first layer of a soft-touch material to the substrate; applying a second layer of a fabric to one of the first mold component and the second mold component of the mold apparatus; forming a self-skinning foam layer, wherein a first surface of the self-skinning foam layer is configured for bonding to the first layer and a second surface of the self-skinning foam layer is configured for bonding to the second layer; and fastening the substrate, the first layer, the second layer together. Additional methods of manufacturing automotive interior components and automotive interior components are also provided.

8 Claims, 2 Drawing Sheets

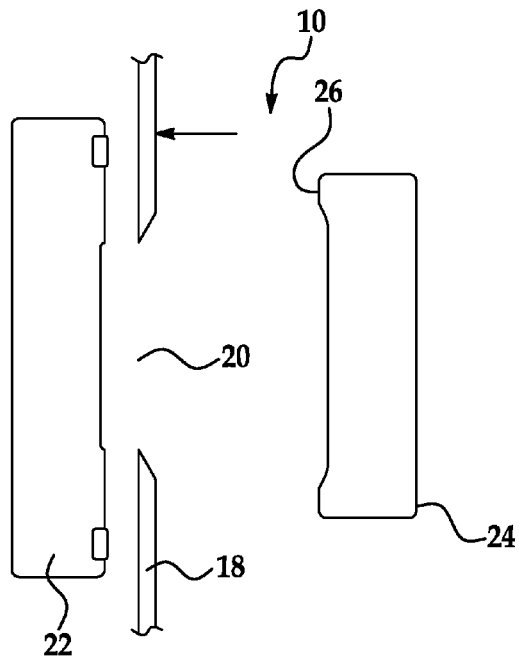
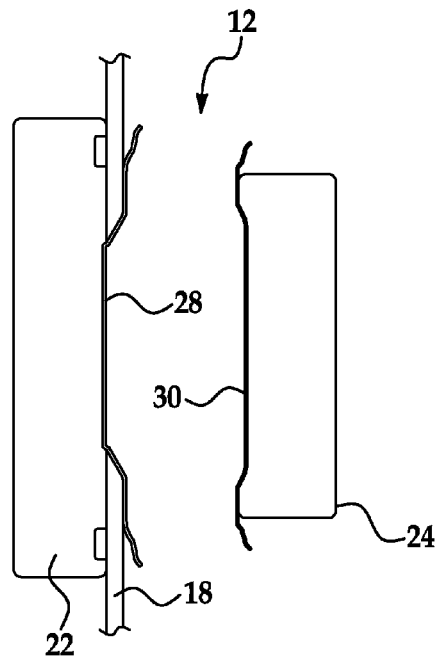
FIG. 1  FIG. 2
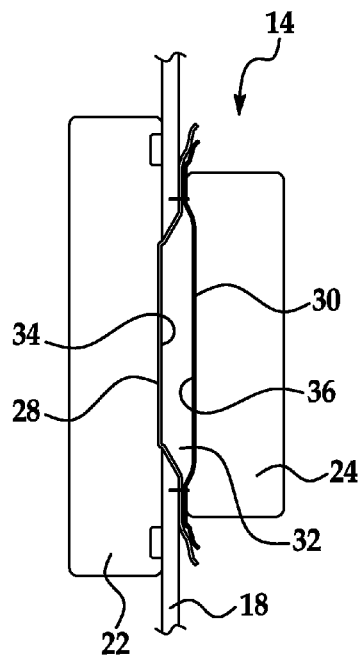
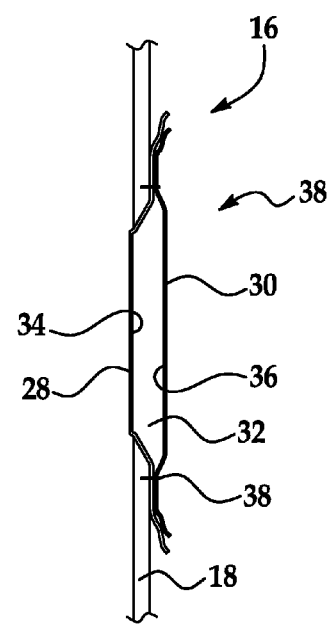
FIG. 3  FIG. 4

COMPOSITE TOUCH ZONE FOR AUTOMOTIVE INSTRUMENT PANELS, DOORS, AND CENTER CONSOLES

CROSS REFERENCE TO RELATED APPLICATION

This application claims the benefit of U.S. Provisional Application No. 61/452,814 filed Mar. 15, 2011, the entire disclosure of which is hereby incorporated by reference in its entirety as though fully set forth herein.

TECHNICAL FIELD

The invention relates generally to a method of manufacturing automotive interior components, such as instrument panels, doors, and center consoles, in which a premium touch and/or soft-touch material is connected directly to a substrate during molding of the automotive interior component. The invention also relates to automotive interior components that may be formed in accordance with such a method. In other embodiments, the premium touch and/or soft-touch material can be formed by molding and then subsequently connected to the substrate.

BACKGROUND

Automotive interior components are often produced in a variety of manufacturing sequences based on the assembly requirements set forth by a manufacturer, and are also produced to a variety of specifications based on the quality and fit expected by customers. In particular, customers expect the surfaces of the interior components of an automobile, such as the instrument panel, doors, center consoles, and other similar components, to have a soft feel. Customers also expect the coloration of the automobile interior components to be visually appealing, such as by having a two-toned appearance and similar visual effects.

The aforementioned automotive interior components typically include a hard substrate, an outer skin, and a polyurethane foam layer sandwiched therebetween. The hard substrate generally is molded to form the component, i.e. instrument panel, door, center console, etc. The outer skin is generally attached to the hard substrate to give the texture and appearance desired by customers, and the foam layer provides or enhances the softness of the component. Premium touch materials (e.g., soft-touch materials) may typically be added through corner sewing, edge wrap, trimming, or combinations thereof.

It may be desirable to provide a method of manufacturing an automotive interior component that eliminates the need for corner sewing, edge wrap, and/or trimming, while still being compatible with decorative sewing and still allowing features to be molded into a surface of the premium touch material in order to add an additional styling element.

SUMMARY

The present invention provides a method of manufacturing an automotive interior component comprising: providing a mold apparatus comprising a first mold component and a second mold component; providing a substrate having at least one opening; applying a first layer of a first material to the substrate, wherein the first material comprises a soft-touch material; applying a second layer of a second material to one of the first mold component and the second mold component of the mold apparatus, wherein the second material comprises a fabric; forming a self-skinning foam layer, wherein a first surface of the self-skinning foam layer is configured for bonding to the first layer and a second surface of the self-skinning foam layer is configured for bonding to the second layer, thereby forming an assembly comprising the substrate, the first layer, the self-skinning foam layer, and the second layer; and fastening the substrate, the first layer, the second layer together. In accordance with some embodiments of the invention, the mold apparatus comprises a vacuum apparatus in fluid connection with the opening of the substrate and the method further comprises: applying a vacuum through the opening of the substrate; and bonding the first layer of the first material to the substrate.

The present invention also provides a method of manufacturing an automotive interior component comprising: providing a mold apparatus comprising a first mold component and a second mold component; forming a self-skinning foam layer within the mold apparatus; removing the self-skinning foam layer from the mold apparatus; providing a substrate; connecting a first layer of a first material to the substrate, wherein the first material comprises a soft-touch material; connecting the first layer of the first material to a first surface of the self-skinning foam layer; and connecting a second layer of a second material to a second surface of the self-skinning foam layer.

The present invention also provides an automotive interior component comprising: a substrate; a first layer of a first material connected to the substrate, wherein the first material comprises a soft-touch material; a second layer of a second material comprising a fabric; and a self-skinning foam layer disposed between the first layer and the second layer, wherein the self-skinning foam layer includes a first surface bonded to the first layer and a second surface bonded to the second layer.

Additional features, advantages, and embodiments of the invention may be set forth or become apparent from consideration of the following detailed description, drawings, and claims. Moreover, it is to be understood that both the foregoing summary of the invention and the following detailed description are exemplary and intended to provide explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and, together with the detailed description, serve to explain the principles of the invention. In the drawings:

FIG. 1 is a schematic view of a vacuum apparatus, substrate, and corresponding lid for the vacuum apparatus configured for use in connection with a first stage of a method of manufacturing an automotive interior component in accordance with an embodiment of the invention.

FIG. 2 is a schematic view of the vacuum apparatus and substrate of FIG. 1 to which a first layer of a first material has been applied and of the corresponding lid for the vacuum apparatus of FIG. 1 to which a second layer of a second material has been applied in connection with a second stage of a method of manufacturing an automotive interior component in accordance with an embodiment of the invention.

FIG. 3 is a schematic view of the vacuum apparatus and corresponding lid for the vacuum apparatus of FIGS. 1-2 in a closed position in connection with a third stage of a method of manufacturing an automotive interior component in accordance with an embodiment of the invention.

FIG. 4 is a schematic view of the automotive interior component formed in accordance with a fourth stage of a method of manufacturing an automotive interior components in accordance with an embodiment of the invention.

DETAILED DESCRIPTION

Figure 5:
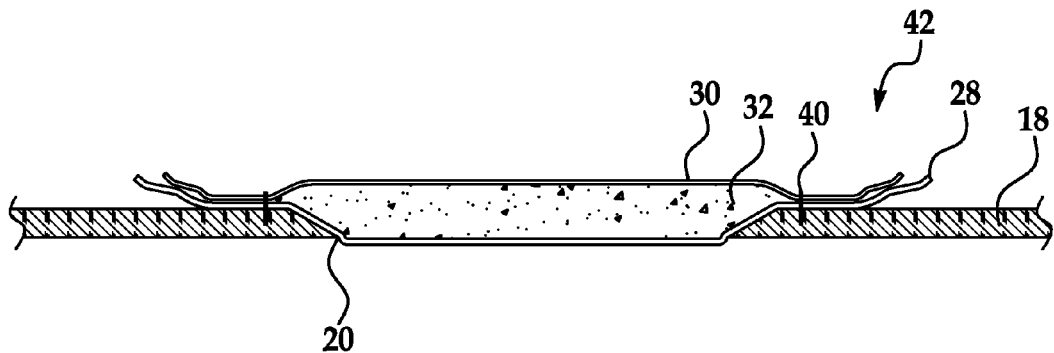
FIG. 5 is an enlarged schematic view of at least a portion of the automotive interior component formed in accordance with an embodiment of the invention.

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Referring now to the drawings wherein like reference numerals designate corresponding parts throughout the several views, FIGS. 1-4 illustrate schematic views of various stages 10, 12, 14, 16 of a method of manufacturing an automotive interior component in accordance with an embodiment of the invention. In particular, a method of manufacturing an automotive interior component in accordance with an embodiment of the invention may allow for the construction of an automotive interior component comprising a composite material including a premium-touch and/or soft-touch material.

Referring to FIG. 1, in a first stage 10 of a method of manufacturing an automotive interior component in accordance with an embodiment of the invention, a substrate 18 is provided having at least one vacuum opening 20. The substrate has a thickness of about 3.5 millimeters in accordance with an embodiment of the invention. Although a particular thickness is mentioned in detail, the thickness of the substrate may be greater or less than 3.5 millimeters in accordance with other embodiments of the invention. The substrate may comprise a polymer in accordance with some embodiments of the invention. Although the substrate is described as comprising a polymer in accordance with some embodiments of the invention, the substrate may comprise any number of materials in accordance with various embodiments of the invention. The substrate 18 may be disposed between two or parts of a molding apparatus, such as between a vacuum apparatus 22 and corresponding lid 24. The vacuum apparatus 22 may comprise a vacuum bowl in accordance with an embodiment of the invention. The corresponding lid 24 for the vacuum apparatus 22 may have a sealing bead 26 in accordance with some embodiments of the invention. Although a vacuum apparatus and corresponding lid is mentioned in detail, the molding apparatus may comprise other types of molding apparatuses in accordance with other embodiments of the disclosure.

Referring now to FIG. 2, in a second stage 12 of a method of manufacturing an automotive interior component in accordance with an embodiment of the invention, a first layer 28 of a first material is applied to the substrate 18. The first layer 28 of the first material may be hand loaded onto the substrate 18. Any wrinkles within the first layer 28 of the first material may be kept in hidden areas. The first material comprises a premium touch and/or soft-touch material in accordance with an embodiment of the invention. For example and without limitation, the first material may comprise premium artificial and/or imitation leather in accordance with an embodiment of the invention. The first material may also have a fabric backing (not shown) in accordance with embodiments of the invention. A fabric backing on the first material may be provided to improve strength of the first material as the first material may be relatively thin and soft in accordance with at least some embodiments of the invention. The vacuum apparatus 22 may be in fluid connection with the vacuum opening 20 of the substrate 18. Vacuum may be applied through the vacuum opening 20 of the substrate 20 such that that the first layer 28 is attracted to and bonds to the substrate 18. Upon actuation of vacuum apparatus 22, the vacuum effect fluidly passes through vacuum opening 20 of substrate 18 to thus attract and bond the first layer 28 of the first material to substrate 18. Upon completion of the aforementioned manufacturing method, one surface of the first layer 28 of the first material is tightly bonded to substrate 18 via the vacuum effect of vacuum apparatus 22. In some embodiments, an adhesion substance (for example and without limitation, glue) may be applied to all or a portion of the surface of the first layer 28 and/or substrate 18 in order to strengthen the adhesion between the substrate 18 and the first layer 28.

In the second stage 12 of a method of manufacturing an automotive interior component in accordance with an embodiment of the invention, a second layer 30 of a second material is applied to the corresponding lid 24 for the vacuum apparatus 22. The second layer 30 of the second material may be provided for strength in accordance with some embodiments of the disclosure. The second material comprises fabric in accordance with an embodiment of the invention. The fabric is configured to seal the foam (to be described in more detail below) from lid 24. The fabric of the second material may comprise a plurality of fibers in accordance with an embodiment of the invention. The plurality of fibers may comprise glass fibers, carbon fibers, polymeric fibers, natural fibers, etc. Synthetic fibers may comprise para-aramid (aromatic polyamide) fibers (e.g., poly-paraphenylene terephthalamide fibers). For example and without limitation, the fibers may comprise synthetic fibers such as aramid fibers generally available from DuPont under the trademark KEVLAR®.

The plurality of fibers may be arranged and/or oriented so as to extend in a single direction in accordance with some embodiments of the invention. Such an embodiment can generally be referred to as a unidirectional fiber cloth. For example, each of the plurality of fibers may extend in a single direction along a longitudinal axis of the fabric in accordance with an embodiment of the invention. In another embodiment, each of the plurality of fibers may extend transversely relative to the longitudinal axis of the fabric in a single direction. In other embodiments of the invention, each of the plurality of fibers may extend obliquely relative to the longitudinal axis of the fabric.

In a preferred embodiment, the plurality of fibers may be arranged and/or oriented so as to extend in two directions. Such an embodiment can generally be referred to as a bidirectional fiber cloth. In a bidirectional fiber cloth, the fibers are oriented in two directions (with the fibers remaining relatively straight for support during bending of the composite). For example, some of the plurality of fibers may extend in a first direction along the longitudinal axis of the fabric, and some of the plurality of fibers may extend in a second direction at 90 degrees (e.g., transverse) relative to the longitudinal axis of the fabric. In other embodiments, each of the plurality of fibers may extend obliquely relative to the longitudinal axis of the fabric. A bidirectional fiber cloth can have excellent strength characteristics, thereby supporting the composite in bending. The fabric comprising the second material of the second layer 30 is generally stiff and has a generally high modulus of elasticity in accordance with an embodiment of the invention. In particular, the fabric comprising the second material of the second layer 30 is more stiff and has a higher modulus of elasticity than fabrics that may not include unidirectional and/or bidirectional fibers. The second layer 30 may include a film of plastic to which the fibers are connected. In accordance with an embodiment of the invention, an adhesive may be applied to a surface of the second layer 30 that is configured for bonding with a surface of a self-skinning foam layer 32 to be described in more detail below.

In the third stage 14 of a method of manufacturing an automotive interior component in accordance with an embodiment of the invention, a self-skinning foam layer 32 may be formed in an open-mold process. The self-skinning foam layer 32 may comprise a foam layer with a high-density skin and a low-density core. The self-skinning foam layer 32 may also generally be referred to as an integral-skin foam layer and may be referred to as having a cellular interior and a microcellular or noncellular skin. The self-skinning foam layer 32 may comprise urethane in accordance with an embodiment of the invention. The self-skinning foam layer 32 may be formed by mixing and pouring at least two reactive components into an open mold defined by the vacuum apparatus 22 and corresponding lid 24, for example.

In general, a self-skinning urethane foam layer may be formed by reacting an organic isocyanate with a substance having at least one isocyanate reactive group. In accordance with an embodiment of the invention, the substance having at least one isocyanate reactive group may comprise a polymeric polyol. A polymeric polyol is a compound with multiple hydroxyl functional groups available for organic reactions. For example and without limitation, the polymeric polyol can comprise polyether polyol. Common polyether polyols comprise, for example and without limitation, polyethylene glycol, polypropylene glycol, and poly(tetramethylene ether) glycol. For another example and without limitation, the polymeric polyol can comprise polyester polyol. A common polyester polyol comprises, for example and without limitation, hydroxyl-terminated polybutadiene.

Referring now to FIG. 3, the mold apparatus defined by the vacuum apparatus 22 and corresponding lid 24 is then closed, and the mixture of the at least two reactive components (for example and without limitation, isocyanate and polyether polyol) is allowed to expand and cure. Other substances, such as blowing agents or foaming agents, may be added into the mold apparatus defined by the vacuum apparatus 22 and corresponding lid 24. The higher density skin forms at the interface of the reaction mixture and an inner surface of the mold apparatus defined by the vacuum apparatus 22. A first surface 34 of the formed self-skinning foam layer 32 is configured for bonding to the first layer 28 of the first material. A second surface 36 of the formed self-skinning foam layer 32 is configured for bonding to the second layer 30 of the second material. An assembly 38 comprising the substrate 18, the first layer 28, the self-skinning foam layer 32, and the second layer 30 is thereby formed.

In other embodiments of the invention, the self-skinning foam layer 32 may be formed by a closed mold process, more commonly known as reaction injection molding (RIM). In an embodiment utilizing reaction injection molding, the self-skinning foam layer 32 may be formed by mixing and pouring at two reactive components into a closed mold under high pressure. Again, other substances, such as blowing agents or foaming agents, may be added into the mold defined by the vacuum apparatus 22 and corresponding lid 24.

Referring now to FIG. 4, in a fourth stage 16 of a method of manufacturing an automotive interior component in accordance with an embodiment of the invention, the assembly 38 comprising the substrate 18, the first layer 28, the self-skinning foam layer 32, and the second layer 30 is removed from the mold defined by the vacuum apparatus 22 and corresponding lid 24. The substrate 18, the first layer 28, and the second layer 30 may be fastened together with a fastener 40 in an embodiment of the invention. The fastener 40 may comprise a staple in accordance with an embodiment of the invention. The substrate 18, the first layer 28, and the second layer 30 may be welded together in accordance with other embodiments of the invention. In an embodiment, the substrate 18, the first layer 28, and the second layer 30 may be fastened together with fastener 40 or may be welded together in an area in which the self-skinning foam layer 32 is not disposed between the first and second layers 28, 30.

Referring now to FIG. 5, an enlarged schematic view of at least a portion of an automotive interior component 42 formed in accordance with an embodiment of the invention is illustrated. The automotive interior component 42 has bonded layers and includes a substrate 18 having at least one vacuum opening 20; a first layer 28 of a first material; a second layer 30 of a second material; and a self-skinning foam layer 32 having a first surface 34 bonded to the first layer 28 and a second surface 36 bonded to the second layer 30.

Figure 6:
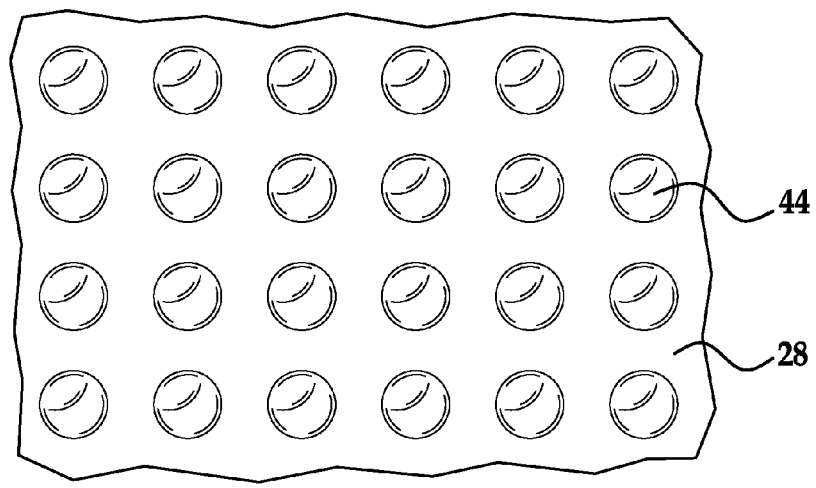
FIG. 6 is an illustrative view of styling features appearing on an automotive interior component formed in accordance with an embodiment of the invention.

Referring now to FIG. 6, in an embodiment of the invention, a surface of the first layer 28 of the premium-touch and/or soft-touch material may include styling features 44. For example, styling features 40 may include grip grains, strakes, and/or other low draw features. The styling features 40 may be transferred from the surface of a foam tool during molding.

In accordance with embodiments of the invention, the method of manufacturing an automotive interior component described herein may be especially useful in adding premium-touch and/or soft-touch materials in small zones within the interior of an automobile where previous manufacturing methods may have required corner sewing, edge wrap, and/or trimming methods. A method of manufacturing automotive interior components in accordance with an embodiment of the invention may allow for a zero gap fit appearance for the automotive interior components and any subcomponents. A zero gap fit appearance may be considered indicative of a high quality product, and the method of manufacturing automotive interior components in accordance with an embodiment of the invention may provide a relatively low cost construction for zero gap fits in connection with an instrument panel, door, and/or center console, as well as any subcomponents. A method of manufacturing an automotive interior component in accordance with an embodiment of the invention may also be compatible with decorative sewing in accordance with an embodiment of the invention. Furthermore, a method of manufacturing an automotive interior component in accordance with an embodiment of the invention may also be configured to allow features to be molded into a surface of the premium-touch and/or soft-touch material to add an additional styling element.

Although the method of manufacturing an automotive interior component is described in four stages, there may be fewer or more stages in the method of manufacturing an automotive interior component in accordance with other embodiments of the invention. Moreover, one or more of the stages of the method of manufacturing an automotive interior component may be modified and/or performed in different orders in accordance with other embodiments of the invention. For example and without limitation, in accordance with another embodiment of the invention, the method of manufacturing an automotive interior component may include first forming a self-skinning foam layer 32 in an open-mold process as generally described hereinabove. A first surface 34 of the formed self-skinning foam layer 32 may then subsequently be fastened to a first layer 28 of a first material and/or substrate 18 in accordance with an embodiment. In some embodiments, a second surface 36 of the formed self-skinning foam layer 32 may be subsequently fastened to a second layer 30 of a second material.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An automotive interior component comprising:
    a substrate;
    a first layer of a first material connected to the substrate, wherein the first material comprises a soft-touch material;
    a second layer of a second material comprising a fabric; and
    a self-skinning foam layer disposed between the first layer and the second layer, wherein the self-skinning foam layer includes a first surface bonded to the first layer and a second surface bonded to the second layer wherein the substrate includes an opening and wherein the first layer of the first material is configured to be connected to the substrate by application of vacuum pressure through the opening of the substrate.

2. A component according to claim 1, further comprising an adhesive on a surface of the second layer that is configured for bonding with the second surface of the self-skinning foam layer.

3. A component according to claim 1, further comprising an adhesive on a surface of the first layer that is configured for bonding with the first surface of the self-skinning foam layer.

4. A component according to claim 1, further comprising a fastener for fastening the substrate, the first layer, and the second layer, wherein the fastener is located in an area in which the self-skinning foam layer is not disposed between the first layer and the second layer.

5. A component according to claim 1, further comprising a styling feature located on a surface of the first layer.

6. A component according to claim 1, wherein the fabric comprises a plurality of fibers.

7. A component according to claim 6, wherein a first portion of the plurality of fibers are oriented in a first direction relative to a longitudinal axis of the fabric, and a second portion of the plurality of fibers are oriented in a second direction relative to the longitudinal axis of the fabric, wherein the first direction and second direction are different.

8. A component according to claim 7, wherein the second direction is substantially transverse to the first direction.

* * * * *